(12) United States Patent
Molino et al.

(10) Patent No.: US 7,623,719 B2
(45) Date of Patent: Nov. 24, 2009

(54) VIDEO ENCODING METHODS AND DEVICES

(75) Inventors: Andrea Molino, Torino (IT); Fabrizio Vacca, Rivarolo Canavese (IT); Mainak Biswas, La Jolla, CA (US); Truong Nguyen, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 903 days.

(21) Appl. No.: 10/948,098

(22) Filed: Sep. 23, 2004

(65) Prior Publication Data

US 2005/0105812 A1 May 19, 2005

(51) Int. Cl.
*G06K 9/36* (2006.01)
(52) U.S. Cl. ......... 382/239; 382/240; 382/248
(58) Field of Classification Search ......... 382/239, 382/240, 248
See application file for complete search history.

(56) References Cited

U.S. PATENT DOCUMENTS

| | | | | |
|---|---|---|---|---|
| 4,890,160 | A * | 12/1989 | Thomas | 348/429.1 |
| 5,845,243 | A * | 12/1998 | Smart et al. | 704/200.1 |
| 6,011,901 | A * | 1/2000 | Kirsten | 386/123 |
| 6,373,895 | B2 * | 4/2002 | Saunders et al. | 375/240.19 |

OTHER PUBLICATIONS

Alattar and Rajala "Estimating Head's Measurements from Front-View Head and Shoulders Images" Proceedings of the 1999 IEEE International Symposium on Circuits and Systems, vol. 4, Jul. 1999, pp. 114-117 (IACS 1999.779955).*

"Video Codec for Audiovisual Services at p x 64 kbit/s", International Telecummunication Union, ITU-T Recommendation H.261, Version 1: Nov. 1990; Version 2: Mar. 1993.

"Generic coding of moving pictures and associated audio information—Part 2: Video", International Organisation for Standardisation Organisation Internationale de Normalisation, Recommendation H.262—ISO/IEC 13818-2 (MPEG-2), Nov. 1994.2.

International Standard 14496-2 "Coding of audio-visual objects. Part 2: Visual", ISO/IEC JTC1. MPEG-4 Visual version 1, Apr. 1999; Amendment 1 (Version 2), Feb. 2000.

(Continued)

*Primary Examiner*—Charles Kim
*Assistant Examiner*—Stephen R Koziol
(74) *Attorney, Agent, or Firm*—Greer, Burns & Crain, Ltd.

(57) ABSTRACT

A video codec of a preferred embodiment is suitable for implementation on a variety of platforms, including platforms where devices require both encoding and decoding engines. Various features of preferred embodiment codecs reduce complexity for operations such as motion determination. Channel resources are allocated in preferred embodiments unequally, with an allocation being determined based upon channel conditions and the error level in a frame being encoded. A decoder of a preferred embodiment, provided with an error frame and motion vector information may conduct decoding with motion compensation. In an example encoder of the invention, a motion estimator identifies motion vectors using a phase plane correlation technique based on phase quantization, where the phase difference between the Fourier transformed version of blocks in a reference frame and a current frame is estimated by dividing the complex plane into sectors and assigning the Fourier domain difference to the sectors.

17 Claims, 7 Drawing Sheets

OTHER PUBLICATIONS

Joint Video Team of ITU-T and ISO/IEC JTC 1, "Draft ITU-T Recommendation and Final Draft International Standard of Joint Video Specification (ITU-T Rec. H.264 | ISO/IEC 14496-10 AVC)", Joint Video Team (JVT) of ISO/IEC MPEG and ITU-T VCEG, JVT-G050, Mar. 2003.

A.R. Calderbank, I. Daubechies, W. Sweldens, B. L. Yeo, "Wavelet transforms that map integers to integers", Applied and Computational Harmonic Analysis, vol. 5, pp. 332-369, 1998.

J. Tian and R. 0. Wells, Jr. "Embedded Image Coding Using Wavelet Difference Reduction", Wavelet Image and Video Compression, P. Topiwala, Editor, 289-301, Kluwer Academic Publishers, 1998.

X. Zhou, E. Q. Li, and Y. Chen, "Implementation of H.264 Decoder on General-Purpose Processors with Media Instructions", to appear in the Proceedings of SPIE Conference on Image and Video Communications and Processing, vol. 5022, 2003 (draft paper available at: http://www.ee.princeton.edu/~ykchen/publications/H264.html).

G. Dane and T. Q. Nguyen, "Motion Vector Refinement for Frame Rate Up Conversion", University of California at San Diego Jacobs School of Engineering Research Review, pp. 309-312, 2003.

G. A. Thomas, "Television motion measurement for DATV and other applications", Research Department Report, British Broadcasting Corporation, Sep. 1987.

"Video coding for low bit-rate communication", ITU-T Recommendation H.263, Version 1, Nov. 1995; Version 2 (H.263+), Jan. 1998; Version 3 (H.263++), Nov. 2000.

* cited by examiner

VIDEO ENCODING METHODS AND DEVICES

FIELD OF INVENTION

A field of the invention is video encoding. Other fields of the invention include video processing, digital communications and digital storage of video data.

BACKGROUND

Digital communication and storage of video data is a difficult task due to the sheer volume of digital data required to accurately describe a video sequence. In video, the amount of data quickly becomes very large. A block-based motion estimation algorithm is an efficient method to describe the motion between image and video data. With motion estimation, the amount of data needed to describe, for example, a video sequence may be greatly reduced, as are the demands on storage media and channels, whether internal hardware channels or communication media. Channel conditions, especially in wireless environments and in applications where significant amounts of data is exchanged, as in video conferencing, may degrade the video being placed on the channel or slow the communication if the channel conditions are not accounted for in the video encoding strategy.

MPEG-4 [4] and H.264 [5] are two of the most recent video compression codecs and standards that are widely used in video broadcasting applications. In particular, the latter has been specifically designed for video transmission over packet networks. These video standards are designed and optimized for broadcasting scenarios (server and client transmission). In particular, both MPEG-4 and H.264 have been designed as highly asymmetric codecs, where the encoder complexity is much higher than that of the decoder. Such a design enables fairly simple decoder implementations, suitable for the integration on mobile applications. However in a two-way real time communication application (such as in videoconferencing), both the encoder and the decoder need to be integrated on the same platform. Accordingly, high encoder complexity can limit application of the standards.

SUMMARY OF INVENTION

A video codec of a preferred embodiment is suitable for implementation on a variety of platforms, including platforms where devices require both encoding and decoding engines. Various features of preferred embodiment codecs reduce complexity for operations such as motion determination. Channel resources are allocated in preferred embodiments unequally, with an allocation being determined based upon channel conditions and the error level in a frame being encoded. A decoder of a preferred embodiment, provided with an error frame and motion vector information may conduct decoding with motion compensation. In an example encoder of the invention, a motion estimator identifies motion vectors using a phase plane correlation technique based on phase quantization, where the phase difference between the Fourier transformed version of blocks in a reference frame and a current frame is estimated by dividing the complex plane into sectors and assigning the Fourier domain difference to the sectors.

DETAILED DESCRIPTION OF PREFERRED EMBODIMENTS

The invention is directed to methods, devices and systems for encoding video data. Embodiments of the invention provide coding that is responsive to the channel upon which the encoded data will be transmitted, and also the nature of the video data, to achieve good quality encoding that makes an efficient use of the channel.

In describing the preferred embodiments, and setting forth the scope of the invention in the claims, the term "frame" encompasses both video frames and portions thereof. Method steps and device components typically operate on portions of video frames, as is known in the art, and such portions may be referred to as blocks, sub-blocks, windowed portions, etc. The term "frame" as used herein therefore encompasses both entire video frames and portions thereof, such as blocks and sub-blocks or selected portions of the frame. Frame, as used herein, could also be used to describe the entire frame or its decimated version or processed version. The term "frame" should be so interpreted in reading the specification and the claims.

Selected preferred embodiments will now be discussed with reference to the drawings, while artisans will appreciate the invention in its broader aspects as well. Embodiments of the invention include methods, and software, firmware, hardware, systems, and computer media performing such methods.

Figure 1:
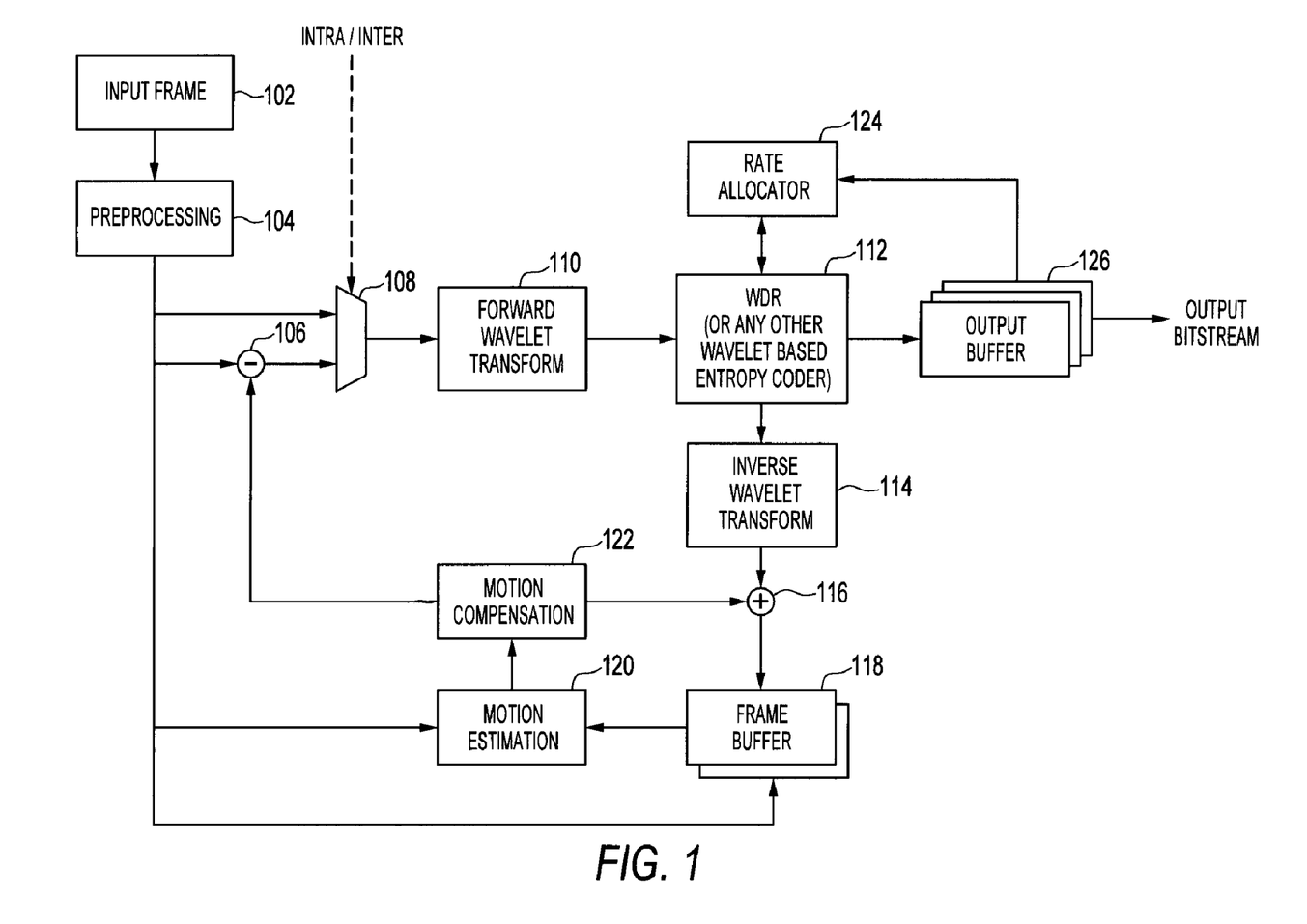
FIG. 1 is a block diagram illustrating an exemplary encoder in accordance with the present invention.

In FIG. 1, which is an overall architecture for an exemplary embodiment video encoder, an input frame 102 is the current frame to be processed and encoded, which may be subjected to a preprocessor 104, which conducts pre-processing operations such as decimation or downsampling. A subtractor 106 sends the difference between the current frame and a motion-compensated (predicted) version of the current frame (starting from the previous one stored in frame buffer 118) to a multiplexer 108 that selects intra/inter coding depending upon the availability of a prior (reference) frame. The aforementioned difference is referred to as an error frame. A forward wavelet transformer 110 handles the frames from the multiplexer 108, and an entropy encoder, e.g., a wavelet difference reduction encoder 112, reduction encodes the frames. An entropy coder encodes the given set of data with the minimum number of bits required to represent them. An inverse wavelet transformer 114 and adder 116 and the frame buffer 118 are used to generate and store the previous (decoded) frame for use by the motion prediction section, which includes a motion estimator 120 and a motion compensator

122. A rate controller 124 is provided with information concerning channel bit rates (for a communication or memory channel, e.g.) from the status of an output buffer 126 and sets a source rate for the reduction encoding in accordance with the channel bit rates. The motion vectors (output of 120), the intra/inter mode signal and the original/FRUC (preprocessing) mode signal will be sent to the decoder via the output bitstream.

Figure 2:
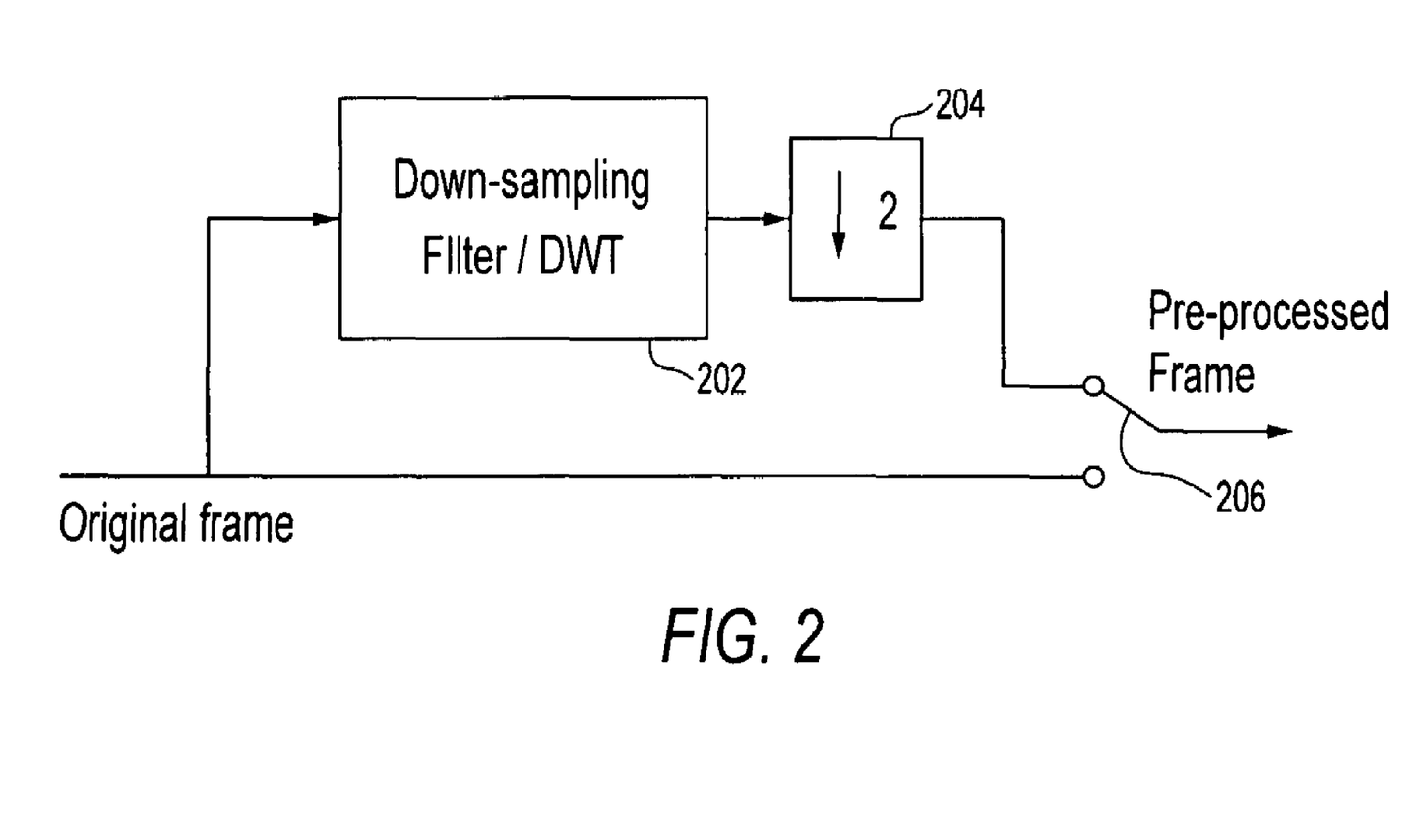
FIG. 2 is a block diagram illustrating an exemplary pre-processing section in accordance with the present invention for use in the encoder of FIG. 1.

Details of an exemplary embodiment pre-processor 104 are shown in FIG. 2. The preprocessor can provide the remaining part of the encoder of FIG. 1 with a frame that can be either the original frame (preprocessing mode is off) or a spatial down-sampled version provided by a down-sampling filter/discrete wavelet transform 202 and a reduction sampling scan 204, e.g., a reduction by 2 in both row and column, of the original frame (preprocessing mode is on). A switch 206 determines the output of the pre-processor 104. By working with low bit rates, the spatial down-sampling allows the encoder components to work with smaller images, achieving better results in the overall visual quality. Otherwise, when a small amount of bits is given to the error frame, the compensated image can exhibit strong blocking artifact. On the other hand, with a down-sampled image, the resulting decoded (eventually up-sampled) image exhibits only blurrier shapes, which is less annoying than the presence of high-frequency artifacts. The down-sampling filter/DWT 202 is employed to avoid aliasing. The down-sampling filter 202: may conduct a DWT (discrete wavelet transform), in which case the reduction sampling scan 204 takes the LL subband of the transformed image as a down-sampled frame. In another exemplary embodiment the filter 202 is a Finite Impulse Response (FIR) filter or to use the DWT (Direct Wavelet Transform) engine.

Preferred embodiments use the discrete wavelet transform 110 since it possesses intrinsic decorrelation properties. The Integer Wavelet Transform (IWT) (See, e.g., A. R. Calderbank, et al., "Wavelet transforms that map integers to integers", Applied and Computational Harmonic Analysis, Vol. 5, pp. 332-369, (1998)) is a suitable preferred transform. In the IWT, there is a mapping of an integer input set to an integer-valued transform domain. Preferred embodiments of the invention employ a ⅗ IWT as the transform stage.

Figure 3:
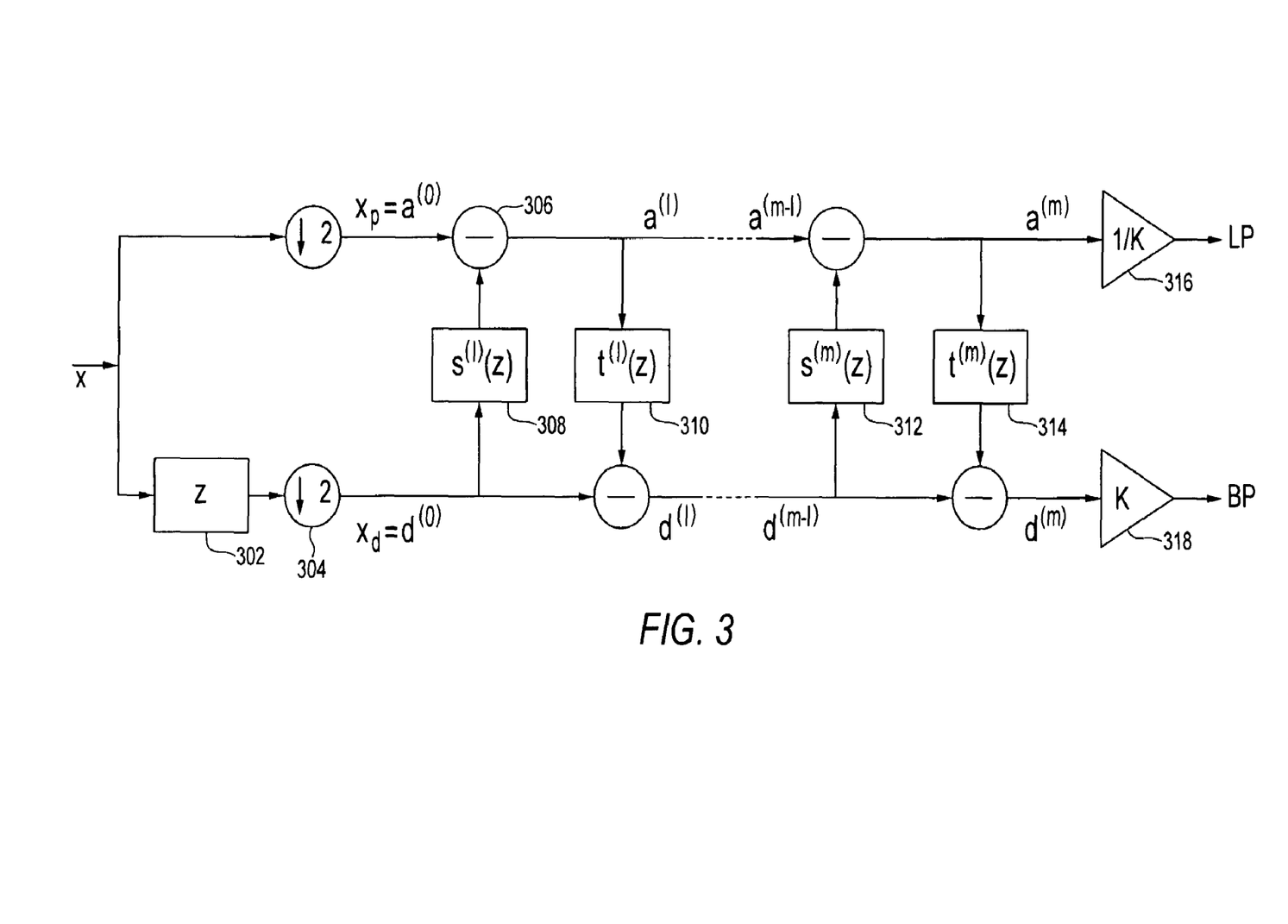
FIG. 3 is a flow diagram illustrating an exemplary discrete wavelet transform by a lifting structure in accordance with the present invention for use in the encoder of FIG. 1.
Figure 4:
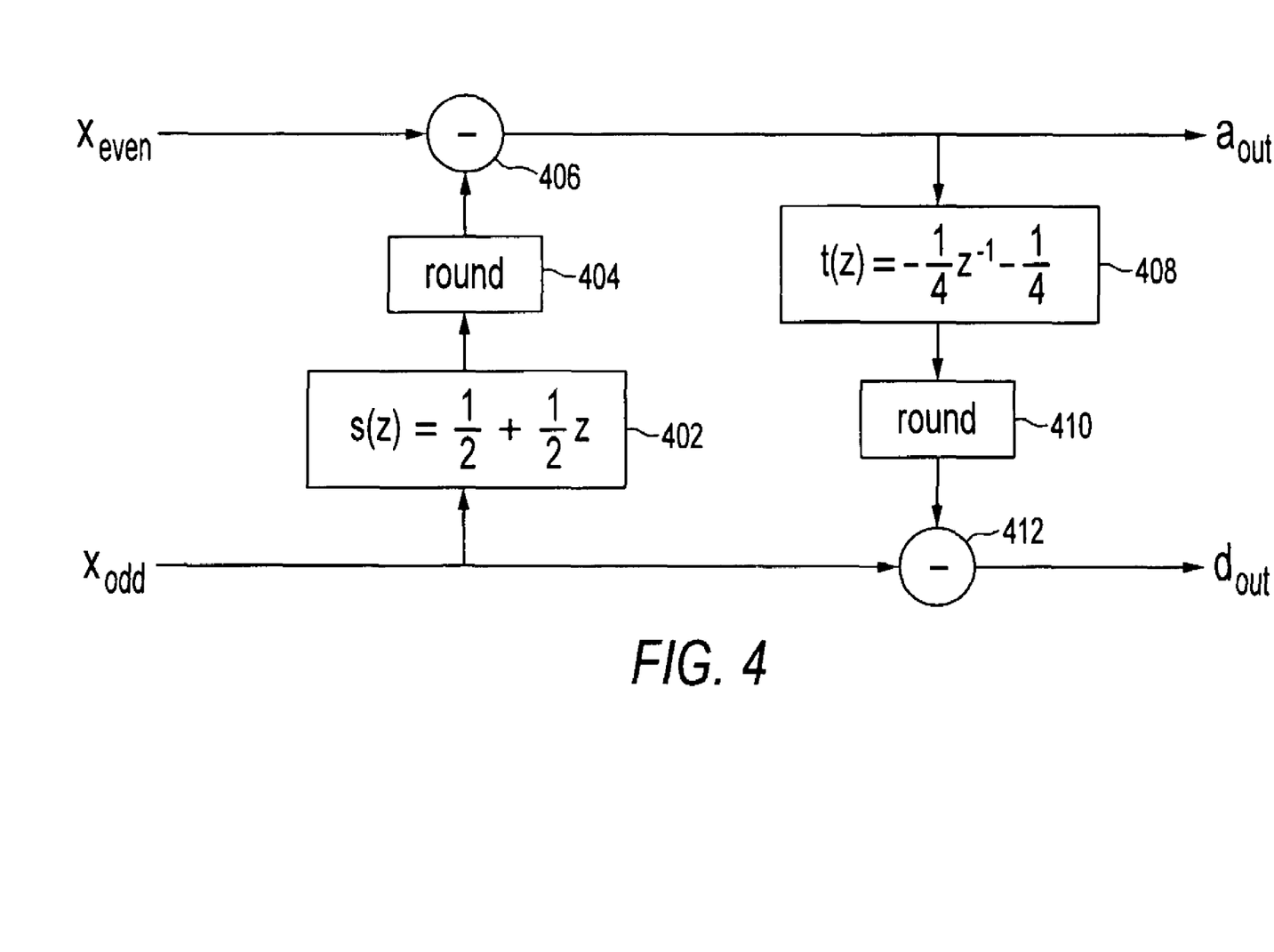
FIG. 4 is a flow diagram illustrating an exemplary integer wavelet transform (IWT) constituting a ⅗ IWT implemented with a lifting structure in accordance with the present invention for use in the encoder of FIG. 1.

FIG. 3 shows a preferred evaluation technique for the DWT and the IWT, which is referred to as a lifting scheme, named after the Calderbank et. al article cited in the previous paragraph. Using the lifting scheme (LS) every wavelet transform can be evaluated as a sequence of very simple steps (called Lifting Steps). In FIG. 3, a generic signal flow for lifting scheme is depicted: A unitary delay 302 is in the lower flow, and both the upper and lower flow including a downsampling 304, e.g., by a factor of 2. A primary lifting step 308 followed by a dual lifting step 310, while 306 is a sum node. Depending upon the wavelet type and its factorization the structure composed by 306, 308 and 310 can be re-iterated accordingly (e.g. blocks 312 and 314), and. 316 and 318 are two multiplications by a constant factor (K and 1/K respectively). Generally speaking, s(z) and t(z) are simple FIR filters. As this factorization is not unique, several s(z), t(z) and K are admissible for a given wavelet type. In FIG. 4, the signal flow for the ⅗ IWT is shown. Block 402 implements the primary lifting step 308 of FIG. 3, while block 408 implements the lifting step 310 of FIG. 3. The rounding operations 404 and 410 are necessary to ensure integer results. Subtractors 406 subtracts outputs of the round operator 404 from xeven(n). Likewise, the subtractor 412 subtracts the output of the round operator 410 from xodd(n).

Each lifting step consists of a simple filter that can be carried out without the need for multiplications (the filter coefficients are ½ and ¼ and can be evaluated through simple shift-and-add operations). This type of evaluation in FIG. 4 is especially advantageous when implemented in a device have limited resources, such as a personal digital assistant (PDA) or a handset, e.g. a cellular phone. Other wavelet transforms may also be used, especially in cases where resources are less limited.

The entropy encoder 112 reduces the amount of information to be transmitted. In a preferred embodiment this is achieved by wavelet difference reduction (WDR). (See, e.g., J. Tian and R. O. Wells, Jr. "Embedded Image Coding Using Wavelet Difference Reduction", Wavelet Image and Video Compression, P. Topiwala, Editor, 289-301, Kluwer Academic Publishers, (1998)). WDR is particularly effective on natural images. In embodiments of the present invention, it is adopted to act as a rate-controlled, multiplier-less quantization stage. Another interesting feature of the WDR is that it may be used to create an embedded bit-stream which permits the creation of multiple descriptors for each frame, providing a bandwidth scalable video source. Where memory resources are limited, the transformed image can be divided into smaller blocks and the WDR can be independently applied to each of the smaller blocks. In a preferred embodiment, the WDR uses a scanning order that is based upon the nature of the video frames being reduction encoded. For example, applied in a videoconferencing application the scanning order is adapted to a head and shoulder layout.

In a preferred embodiment, the WDR uses a particular symbol encoding that has been developed in order to minimize the number of bits needed to signal the End-Of-Significance coding pass. According to this strategy the symbols are emitted as follows:

| | |
|---|---|
| 0 | 1S |
| 1 | 001S |
| 2 | 011S |
| 3 | 01001S |
| 4 | 01011S |
| ... | ... |
| EOS | 00001 | where S represents the sign of the sample and can be either 0 or 1, while EOS stands for End-Of-Significance.

In the WDR encoder, an internal buffer stores the reconstructed version (decoder side) for the current block. In this way it is possible to avoid the presence of a separate decoder block on the feedback loop, which provides a significant complexity reduction.

Motion prediction, as mentioned above includes motion estimator 120 and motion compensator 122. In embodiments of the invention, the motion estimator 120 may be realized by various known techniques for motion estimation, including those used in many video coding standards. The motion estimator 120 finds motion vectors (MVs) that represent the motion between two consecutive frames. These motion vectors are sent to the decoder as part of the output bitstream. Devices of the invention include devices having limited computational and memory resources, e.g., the previously mentioned PDAs and cell phones. Preferred embodiments of the invention particularly suited to such devices use a low complexity motion estimation, such as the exemplary motion estimator shown in FIG. 5. Pre-processing 502 may be a proper 2-dimensional window or filter to mitigate the block's edges contribution. A Fast Fourier Transform (FFT) 504 of the corresponding windowed (or filtered) versions of two signal blocks in the two frames (reference and current frames) is calculated, one being provided directly from pre-processing and the other (reference) being provided by a delay buffer 506. The phase difference is determined by taking the dot product 508, and conducting a normalization 510. The inverse Fast Fourier transform (IFFT) 512 produces a surface where the position of the maximum indicates the value of the estimated motion vector. Maximums are determined for windows of the signal blocks as candidate vectors 514.

Figure 5:
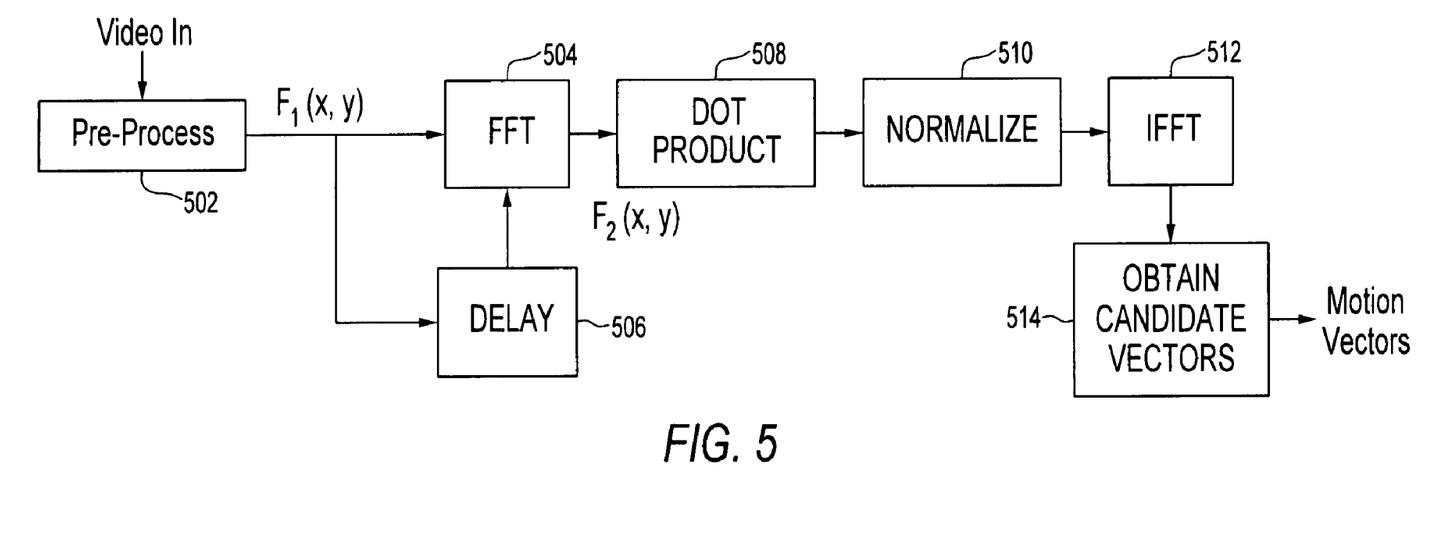
FIG. 5 is a block diagram showing an exemplary embodiment low complexity motion estimator in accordance with the present invention for use in the encoder of FIG. 1.

The general technique embodied in FIG. 5 can require computation of a large number of phase differences among the transformed values. The successive steps needed to compute such difference may be referred to as phase extraction and actual phase difference determination. Computational expense is incurred for each difference because both a division and an arctangent are computed. Also, to avoid numerical misrepresentation, the employment of a floating-point arithmetic is advisable, but this may be a burden in devices with limited resources. An embodiment of the invention for such applications substitutes an effective approximation for the phase difference step, which we refer to as phase quantization (PQ). In the modified embodiment using PQ, the computation of the dot product 508 and the normalisation 510 may be avoided. Depending on the implementation platform, the PQ strategy can be activated or not, since it can produce advantages in a hardware or digital signal processing (DSP) implementation, while it is not convenient implementing the motion estimator on a general purpose processor.

The basic purpose of phase quantization is to avoid the need to compute the dot product and conduct normalization, and estimation techniques that perform this task adequately may be used. To avoid situations where, due to highly noisy images or large motion, the obtained MVs are not corresponding to the true motion, use of estimation should also include verifying the correctness of the motion vectors. A suitable verification may include, for example, the calculation of two SAD (Sum of Absolute Difference) operations to evaluate if a subject moved block exhibits or not more correlation in the current frame with respect to the original (not moved) position.

A preferred phase quantization PQ will now be described. The task is to approximate the phase difference of two input complex signals, $A=Ar+jAi$, and $B=Br+jBi$, where Ar and Br are the real parts of A & B, and Ai and Bi are the imaginary parts of A & B. In a first step the complex plane is divided into eight slices of 45° sectors, starting at 0°, and each input sample is assigned to one of these sectors. This operation is computationally effortless, since it can be done computing only three comparisons for each input coefficient (for example, for the A input it is necessary to evaluate the expressions: Ar>0, Ai>0, Ar>Ai). In this way, we can evaluate the phase difference by only comparing the relative position of the input samples, with a coarse precision of plus or minus 45°. The second step rotates clockwise A and B by an angle multiple of 45°, and translates them into the first sector (0°-45°). In this way we loose the information relative to the first approximation. The next step is to compute $A^4$ and $B^4$: in this way the incertitude interval is expanded by a factor of four since the obtained results have phase which is four times the original one. Now the slice-lookup operation can be repeated and a better approximation of the phase difference can be achieved. The last two steps (4th-power and lookup operation) can be reiterated as many times as is needed to obtain the required precision.

Figure 6:
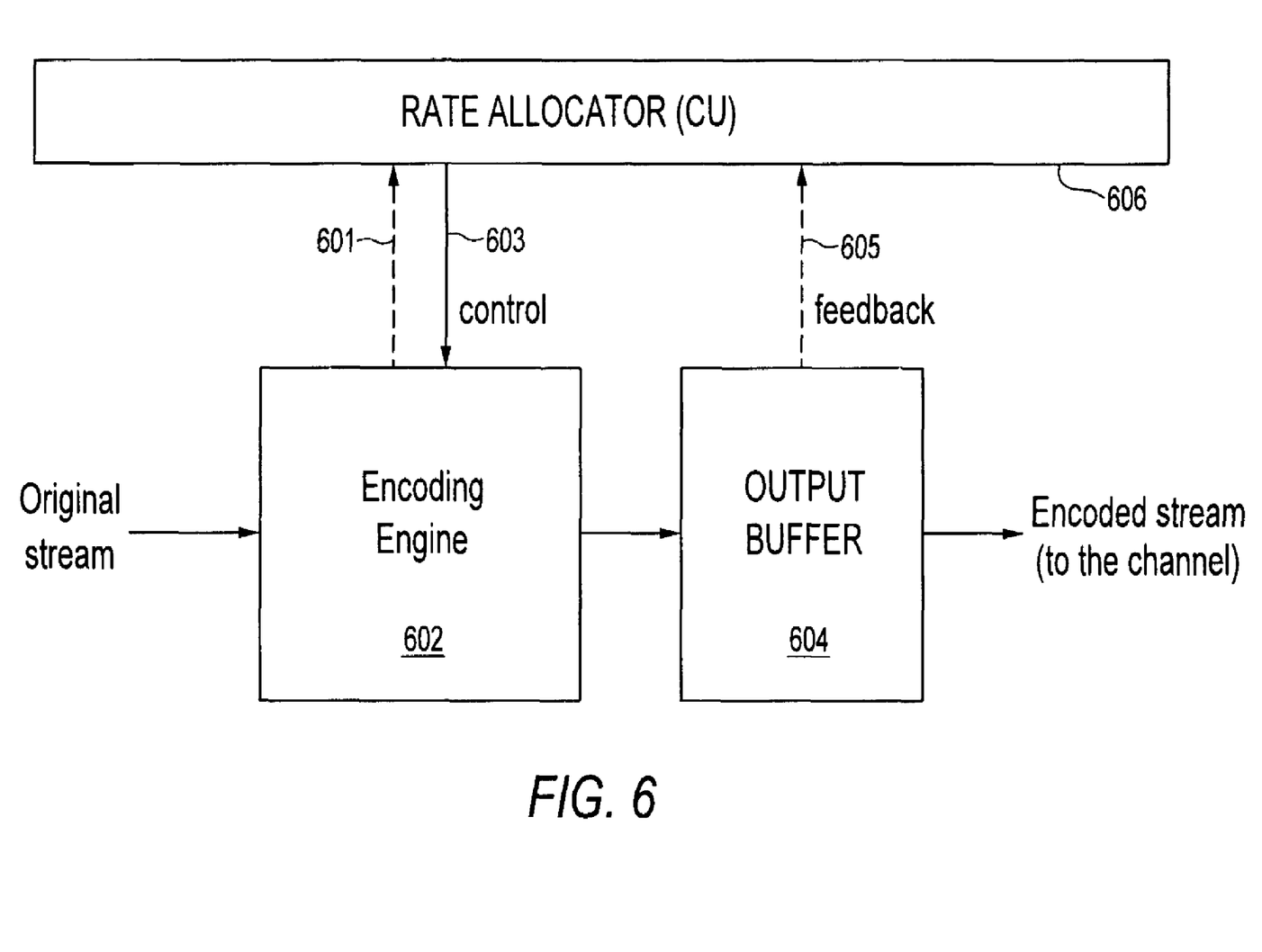
FIG. 6 is a block diagram showing an exemplary embodiment rate allocator in accordance with the present invention for use in the encoder of FIG. 1.

FIG. 6 is a block diagram of an exemplary rate allocator 124 for FIG. 1. The rate allocator serves to distribute the overall bit budget of a channel among the different frames. Different frames may use a different amount of bits for encoding since an equal distribution can penalize the frames with high motion (error frames with high energy). The rate controller exchanges information with the encoding engine 602, which includes blocks 102, 104, 106, 108, 110, 112, 114, 116, 118, 120 and 122 of FIG. 1. The rate controller manages an output buffer 604 (126 in FIG. 1) through a rate allocator block Control Unit (CU) 606. The CU 606 seeks to avoid situations where the buffer 604 is full or empty, given that the encoded stream is sent at a fixed bit rate, and the encoding engine 602 produces a variable bit rate. In a preferred embodiment, the controller 606 sets the source bit rate using information about the channel conditions and information about how well the current frame has been predicted.

In a preferred embodiment, the controller 606 computes a metric and then assigns to this frame (and then to the relative error frame) a quantity of bits (signal 603) proportional to the inverse of this metric. In this way, the "less-well predicted" frames (with an expected significant energy in the error frame) are given more bits, and contrariwise for the well predicted ones. In a preferred embodiment, the metric used to evaluate the correctness of the prediction is the average of the peaks found during the FFT-based motion estimation step, in the phase plane domain, as described above with respect to FIG. 5.

The rate allocator 124 may then operate as follows: At the beginning of the transmission, the quantity prec_bit_budg is calculated: this is the amount of bit to give each frame on the hypothesis of equal distribution. Then, for each frame n in the sequence, the motion estimator 120 returns the values of the motion-vector's peaks (magnitude) found in the entire frame.

1) The average of these values is calculated: Peak(n);

2) In a variable inside the rate allocator 124, the history Hist(n) of this value is stored, as an average among the N past frames;

$$Hist(n) = \frac{1}{N} \sum_{i=1}^{N} \text{Peak}(n-i)$$

3) A factor, γ(n), is calculated as $$\gamma(n) = \frac{Hist(n)}{\text{Peak}(n)}$$

4) A bit budget proportional to this factor is given to the current frame:

$$\text{bit}_{budg}(n) = \gamma^k(n) \cdot \text{prec}_{bit_{budg}}$$

5) The value of Hist(n) is updated with the current value of Peak(n);

The values of N and k can be changed, making the rate allocator more or less reactive to the changes in the sequence. Simulations have shown the metric to be a good indicator of the visual quality of a predicted frame. The metric calculation does not add significant computational overhead because the calculation of the phase peaks is done in the motion estimator 120 and the metric calculation is leveraged off of the information already produced by the motion estimator 120.

Additionally, the rate allocator 124 can skip a given frame under selected conditions. For example, if the buffer level is more than a programmable threshold (feedback given by signal 605), a frame might be skipped. As another example, when the expected error energy is more than another programmable threshold, a frame might be skipped. When skipping a frame, a decoder will duplicate the previous frame, avoiding situations where the visual quality can be degraded. This is an effective strategy in applications where a device decoding the video experiences channel conditions that result in circumstances such as scene cut, fade-in, fade-out etc.

Figure 7:
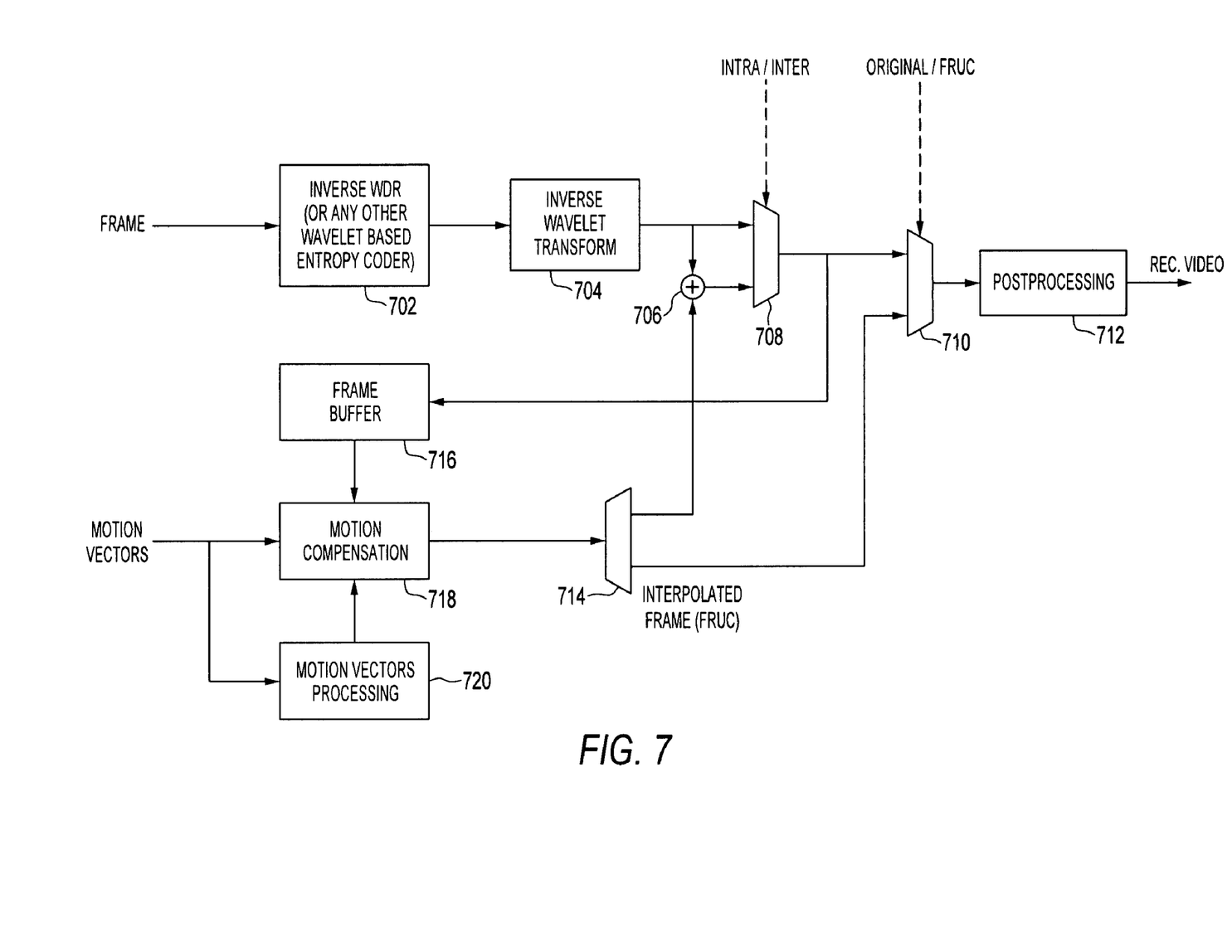
FIG. 7 is a block diagram of an exemplary embodiment decoder in accordance with the present invention.

FIG. 7 illustrates a decoder in accordance with an embodiment of the invention. At the other end of the transmission chain, a decoder is required in order to reconstruct the video sequence. The decoder conducts the inverse of the encoding operation and has similar functions to the decoder of FIG. 1. However, the decoder can be advantageously implemented, for example, without a motion estimator. This is reasonable since during the decoding operation when encoding has been conducted in accordance with the invention, both the motion vector error signal information are available to the decoder.

An inverse WDR 702 is the inverse of the WDR 112 of FIG. 1. An inverse wavelet transform 704 is the same as the IWT 114 of FIG. 1. Adder 706 adds the motion-compensated frame to the decoded Error Frame (i.e. the output of block 704). Multiplexer 708 is for the selection of Intra/Inter mode. Multiplexer 710 is for the selection of original (decoded) frame or a Frame-Rate up-converted version. Postprocessor block 712, if enabled, is devoted to enhance the output frame. It either upsamples the frame size or generates more frames using the Frame Rate Up Conversion technique described below. If this option is activated together with the input Frame down-sampling (FIG. 2), the decoder can produce a reconstructed sequence with the same size of the original one. As in the down-sampling block, it is possible to employ either an up-sampling FIR filter or the IWT engine, using the decoded image as LL wavelet subband. Frame buffer 716 is a memory that contains the past frame. Motion compensator 718 implements the same function as the compensator 122 of FIG. 1. Motion vector processor 720 performs the Frame Rate Up-Conversion (FRUC). Its main purpose is to process motion vectors in order to obtain new, consistent motion vectors for generating more frames at the decoder, which enables smoother video display. When the FRUC option is enabled, block 720 provides the obtained motion field to 718. The de-multiplexer 714 directs data to multiplexer 710. Otherwise, 714 directs data to adder 706.

The frame rate up-converter creates a higher frame rate starting from a lower one. Up-conversion can be advantageous in a low bit-rate scenario (as in wireless communications). As an example, the encoder can send a 5 frame per second (fps) sequence and, by up-conversion, the decoder can produce the 10 fps version, leading to an improvement of the visual quality.

An exemplary FRUC is described in G. Dane and T. Q. Nguyen, "Motion vector processing for frame rate up conversion," in proceedings of IEEE International Conference on Acoustics, Speech, and Signal Processing, 2004, Volume: 3, 17-21 May 2004.

To reduce computational complexity, an embodiment of the invention uses a frame rate up-conversion that operates only on the motion vector field. The FRUC produces an interpolated version: the obtained motion vectors for the reconstructed frame are simply the average of the past and the current value of the motion vectors in the corresponding block.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A video encoder comprising:
    a wavelet transformer configured to receive and encode an error frame based upon a current frame and predicted frame;
    a motion predictor to determine the predicted frame;
    an entropy coder receiving and reduction encoding frames from said wavelet transformer;
    a rate controller provided with channel bit rates and setting a source rate for the reduction encoding of said entropy coder in accordance with the channel bit rates; and
    an output buffer connected to a channel to buffer reduction encoded frames from said entropy encoder to be transmitted on the channel;
    wherein said motion predictor includes a motion estimator, and said motion estimator uses the relative phase difference between Fast Fourier transformed representations of blocks in the current frame and blocks in the reference frame;
    wherein said rate controller allocates bits to frames by beginning with an assumption equal bit distributions for frame, and then, for each frame n in the sequence:
    examining the magnitude of motion vector peaks in a frame being evaluated, the peaks being obtained from said motion estimator;
    calculating an average of the motion vector peaks;
    maintaining a stored history of the motion vector peaks as an average from a number N of past frames; and
    setting a bit budget for the frame being evaluated in proportion to a ratio between the magnitude of motion vector peaks and the average of the motion vector peaks.

2. The video encoder of claim 1, wherein: said wavelet transformer conducts a discrete wavelet transformation with a lifting structure; and
    said entropy coder comprises a wavelet difference reduction coder.

3. The video encoder of claim 2, wherein said wavelet difference reduction encoder:
    receives frames from said wavelet transformer;
    divides frames received from the wavelet transformer into smaller blocks;
    applies wavelet difference reduction to each of the smaller blocks; and
    handles the smaller blocks when applying wavelet different reduction in a scanning order that is based upon the nature of the video frames being reduction encoded.

4. The video encoder of claim 3, wherein said wavelet difference reduction encoder handles the smaller blocks in an order corresponding to a head and shoulders scanning pattern for video frames of video conferencing data.

5. The video encoder of claim 2, wherein said rate controller determines channel bit rate from status information of said output buffer.

6. The video encoder of claim 5, wherein said rate controller further sets the source rate in accordance with feedback from said entropy encoder.

7. The video encoder of claim 6, wherein the feedback from said entropy encoder comprises a metric indicating how well the predicted frame models the current frame.

8. The video encoder of claim 7, wherein said rate controller sets the source rate in inverse proportion to the metric.

9. The video encoder of claim 1, wherein said rate controller determines channel bit rate from status information of said output buffer.

10. The video encoder of claim 1, wherein said rate controller further sets the source rate in accordance with feedback from said entropy encoder.

11. The video encoder of claim 10, wherein the feedback from said entropy encoder comprises a metric indicating how well the predicted frame models the current frame.

12. The video encoder of claim 11, wherein said rate controller sets the source rate in inverse proportion to the metric.

13. The video encoder of claim 1, wherein said motion predictor includes a frame buffer for storing an original, unpredicted version of the reference frame.

14. The video encoder of claim 1, wherein said rate controller further updates the average of the motion vector peaks.

15. The video encoder of claim 1, wherein said motion predictor includes a frame buffer for storing an original, unpredicted version of the reference frame.

16. The video encoder of claim 1, further comprising a pre-processor for pre-processing received frames.

17. The video encoder of claim 16, wherein said pre-processor down-samples received frames.

* * * * *

UNITED STATES PATENT AND TRADEMARK OFFICE
CERTIFICATE OF CORRECTION

PATENT NO. : 7,623,719 B2 Page 1 of 1
APPLICATION NO. : 10/948098
DATED : November 24, 2009
INVENTOR(S) : Molino et al.

It is certified that error appears in the above-identified patent and that said Letters Patent is hereby corrected as shown below:

On the Title Page:

Insert the following Item (60) U.S. Priority Data:

-- Related U.S. Application Data

(60) Provisional application No. 60/506,438, filed on September 26, 2003. --

In the Specification:

Col. 1, Line 5    Insert the following statement of U.S. Priority:

-- PRIORITY CLAIM AND CROSS-REFERENCE TO
      RELATED APPLICATION       This application is entitled to the benefit of U.S. Provisional Application Ser. No. 60/506,438, filed September 26, 2003, under 35 U.S.C. §119. --

Signed and Sealed this

Seventeenth Day of August, 2010

David J. Kappos
*Director of the United States Patent and Trademark Office*